(12) United States Patent
Deng

(10) Patent No.: US 8,984,743 B2
(45) Date of Patent: Mar. 24, 2015

(54) EJECTING DEVICE

(75) Inventor: Ting-Hui Deng, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 193 days.

(21) Appl. No.: 13/594,975

(22) Filed: Aug. 27, 2012

(65) Prior Publication Data

US 2013/0160285 A1 Jun. 27, 2013

(30) Foreign Application Priority Data

Dec. 24, 2011 (CN) .......................... 2011 1 0438353

(51) Int. Cl.
| | | |
|---|---|---|
| B23P 21/00 | (2006.01) | |
| B23Q 15/00 | (2006.01) | |
| H04M 1/00 | (2006.01) | |
| H04B 1/38 | (2006.01) | |

(52) U.S. Cl.
CPC . *H04M 1/00* (2013.01); *H04B 1/38* (2013.01); *H04B 1/3816* (2013.01); *H04M 2250/14* (2013.01); *Y10T 29/53283* (2015.01)
USPC ................. 29/721; 29/225; 29/729

(58) Field of Classification Search
USPC .......... 29/225, 721, 729, 752, 754, 757, 764, 29/768, 808
See application file for complete search history.

(56) References Cited

U.S. PATENT DOCUMENTS

| | | | | |
|---|---|---|---|---|
| 3,594,888 | A * | 7/1971 | Folk et al. ...................... | 29/735 |
| 4,092,753 | A * | 6/1978 | Fuhrmann ...................... | 7/158 |
| 6,119,495 | A * | 9/2000 | Loreti ............................ | 70/340 |
| 6,325,393 | B1 * | 12/2001 | Chen et al. .................... | 279/22 |
| 6,874,791 | B2 * | 4/2005 | Chen et al. .................... | 279/75 |
| 8,172,236 | B2 * | 5/2012 | Shibata ......................... | 279/143 |
| 8,267,408 | B2 * | 9/2012 | Chen .............................. | 279/22 |
| 8,292,304 | B2 * | 10/2012 | Wienhold ...................... | 279/22 |
| 8,366,120 | B2 * | 2/2013 | Hu ................................. | 279/82 |
| 2013/0061894 | A1 * | 3/2013 | Liu ................................ | 135/82 |

* cited by examiner

*Primary Examiner* — Paul D Kim
(74) *Attorney, Agent, or Firm* — Novak Druce Connolly Bove + Quigg LLP

(57) ABSTRACT

An ejecting device includes a housing and a pushing mechanism received in the housing. The pushing mechanism includes a pushing component. The pushing component is movably secured to the housing for pushing an object. When the pushing mechanism is in a resisting state, the pushing component protrudes out of the housing to push the object. When the pushing mechanism is in an unresisting state, the pushing component retracts into the housing and disengages from the object.

15 Claims, 4 Drawing Sheets

EJECTING DEVICE

BACKGROUND

1. Technical Field

The present disclosure relates to an ejecting device; and particularly, to an ejecting device for detaching an electronic card.

2. Description of Related Art

Electronic devices, such as mobile phones, and notebook computers may employ an electronic card (e.g., SIM card, SD card) for storing information, connecting to the internet, and dialing calls, for example. Many of these electronic devices include a housing defining a through hole, and a card holding mechanism for receiving and holding the electronic card. The card holding mechanism includes a tray movably connected to the housing and a rotating arm engaging with the tray. When detaching or replacing the electronic card, a user must insert an ejecting tool into the through hole and push the rotating arm to eject the tray from the housing. However, if the pushing force of the ejecting tool is too strong during the pushing operation, the tray may be damaged, thereby damaging the electronic card.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
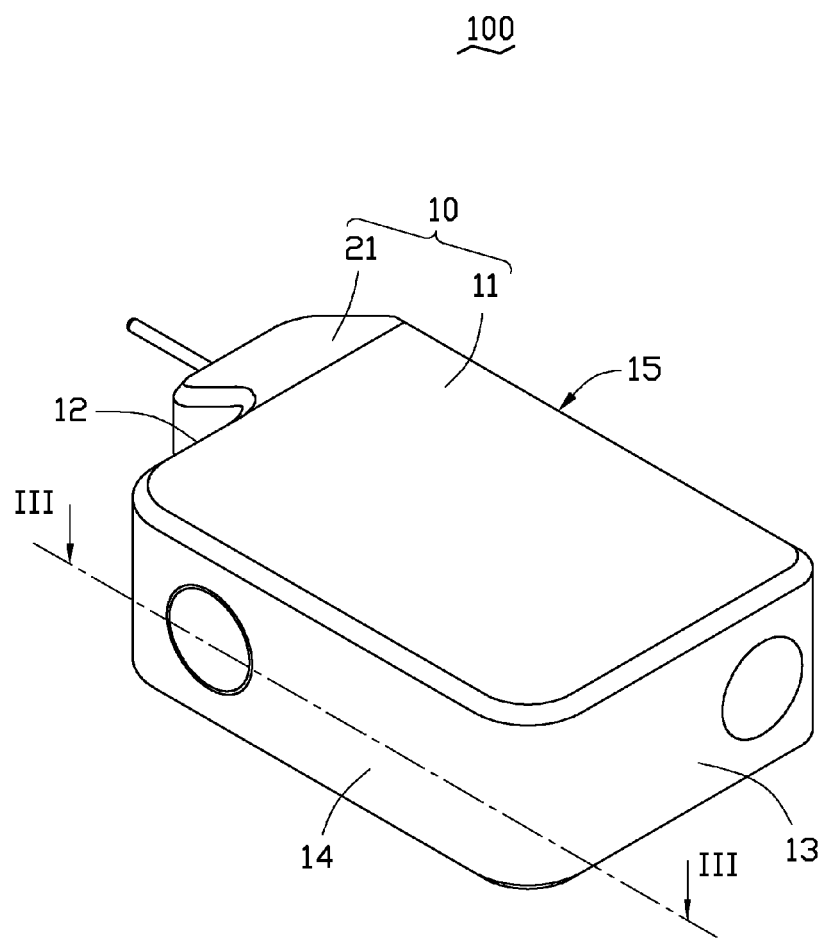
FIG. 1 is an isometric view of an embodiment of an ejecting device.

Referring to FIG. 1, an ejecting device 100 for detaching an electronic card from an electronic device (not shown) is provided. The ejecting device 100 includes a housing 10 and a pushing mechanism 30 (shown in FIG. 2) movably received in the housing 10. The housing 10 includes a main body 11 and a protruding portion 21 protruding from a side of the main body 11.

The main body 11 is substantially rectangle, and includes a first end portion 12, a second end portion 13 opposite to the first end portion 12, a third end portion 14, and a fourth end portion 15 opposite to the third end portion 14. The first, second, third, and forth end portions 12, 13, 14 and 15 are serially interconnected. The protruding portion 21 protrudes from the first end portion 12.

Figure 2:
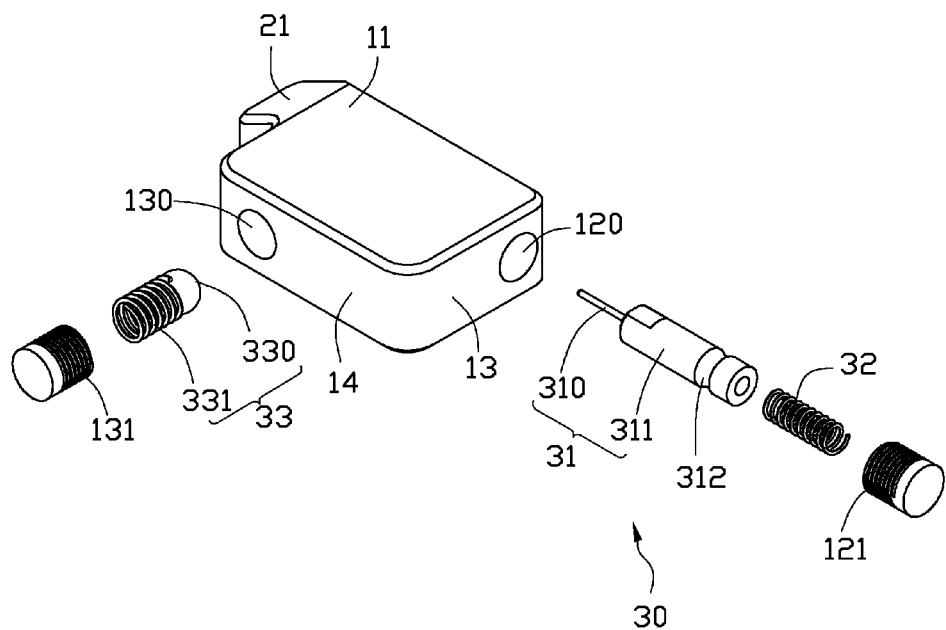
FIG. 2 is a partial, exploded view of the ejecting device of FIG. 1.
Figure 3:
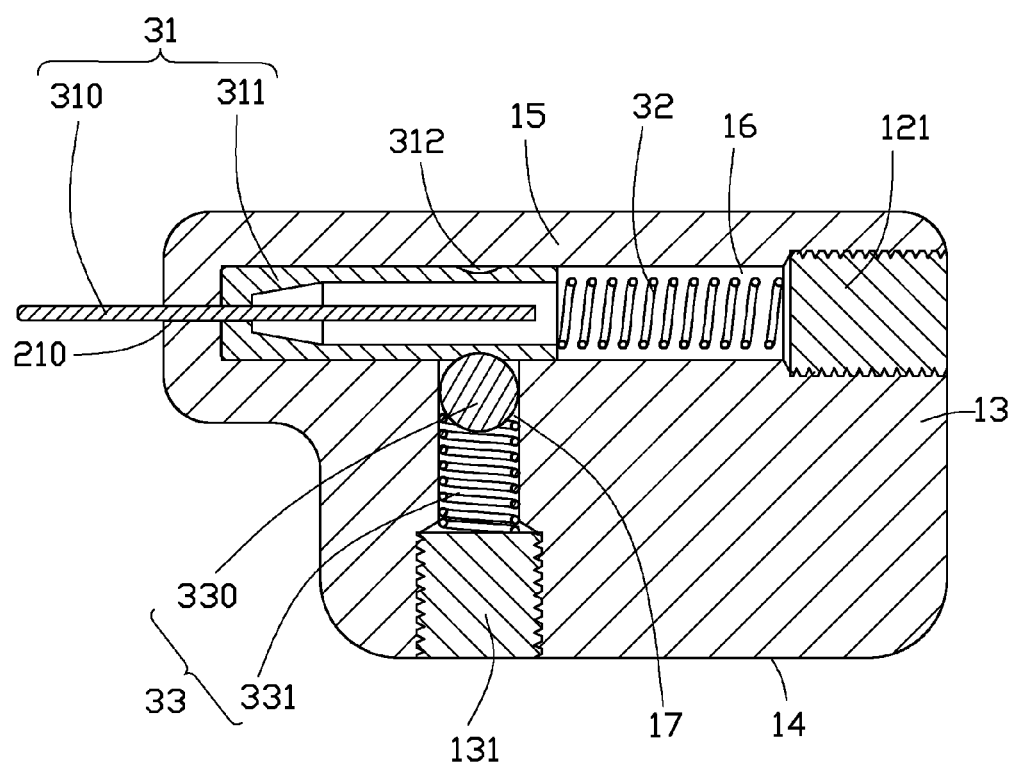
FIG. 3 is a cross-sectional view taken along line III-III of FIG. 1, showing the ejecting device in a first state of use.

Referring to FIGS. 2 and 3, the protruding portion 21 of the embodiment is shown. The protruding portion 21 defines a first mounting hole 210. The first mounting hole 210 extends in a first direction perpendicular to the first end portion 12. The second end portion 13 defines a second mounting hole 120 opposite to the first mounting hole 210. A first fixing component 121 is threaded in the second mounting hole 120. The third end portion 14 defines a third mounting hole 130. The third mounting hole 130 extends in a second direction perpendicular to the first direction. A second fixing component 131 is threaded in the third mounting hole 130. In the embodiment, the first fixing component 121 and the second fixing component 131 are threaded column, and are capable of being changed via an external tool (not shown).

The interior of the main body 11 defines a first receiving groove 16 and a second receiving groove 17. The first receiving groove 16 is positioned between the first mounting hole 210 and the second mounting hole 120, and is larger than the first mounting hole 210 but smaller than the second mounting hole 120. The first receiving groove 16, the first mounting hole 210, and the second mounting hole 120 communicate with each other. The second receiving groove 17 is perpendicularly connected to the first receiving groove 16, and is positioned between the first receiving groove 16 and the third mounting hole 130. The size of the second receiving groove 17 is smaller than the third mounting hole 130. The first receiving groove 16, the second receiving groove 17, and the third mounting hole 130 communicate with each other.

The pushing mechanism 30 is movably received in main body 11, and is operable between a resisting state for resisting an object (not shown) and an unresisting state for disengaging with the object.

The pushing mechanism 30 includes a pushing component 31, a first elastic component 32 and a supporting component 33. The pushing component 31 and the first elastic component 32 are received in the first receiving groove 16. The supporting component 33 is received in the second receiving groove 17.

The pushing component 31 is received in an end of the first receiving groove 16 opposite to the first fixing component 121. The pushing component 31 is capable of moving between a resisting position for resisting the object and an unresisting position for disengaging from the object. The pushing component 31 includes a pushing portion 310 movably received in the first mounting hole 210, a sleeve 311 sleeved on the pushing portion 310, and an engaging portion 312. The pushing portion 310 is substantially column-shaped, and the shape corresponds to the shape of the first mounting hole 210 for mating with the first mounting hole 210. The sleeve 311 is movably received in the first receiving groove 16, and the size is the same as the size of the first receiving groove 16. The engaging portion 312 is secured to the sleeve 311. The engaging portion 312 in the embodiment is a groove defined around the outer surface of the sleeve 311. The cross section of the groove is arc-shaped.

The first elastic component 32 is arranged between the pushing component 31 and the first fixing component 121. The first elastic component 32 is used for providing a resisting force to the pushing component 31 in the resisting position when the pushing component 31 is pressed, and applying a rebound force to the pushing component 31 in the unresisting position when the pushing component 31 is released.

The supporting component 33 connects between the second fixing component 131 and the sleeve 311. The supporting component 33 includes a locking component 330 and a second elastic component 331. The locking component 330 is spherical, and the shape corresponds to the engaging portion 312. In the embodiment, the locking component 330 is a steel ball. The locking component 330 engages with the engaging portion 312 to retain the pushing mechanism 30 in the resisting state. The second elastic component 331 is a spring, and is arranged between the locking component 330 and the second fixing component 131 to provide an elastic force for driving the locking component 330 to continuously abut the sleeve 311.

In assembly, first, the pushing component 31 is inserted into the second mounting hole 120, with the sleeve 311 being slidably received in the first receiving groove 16. The pushing portion 310 extends through the first mounting hole 210 and is exposed out of the first end portion 11. The first elastic component 32 is received in the first receiving groove 16 with an end abutting the sleeve 311. The first fixing component 121 is screwed into the second mounting hole 120 to press the first elastic component 32. At this time, the deformed first elastic component 32 provides an elastic force to drive an end of the pushing component 31 adjacent to the first mounting hole 210 abutting the corresponding end of the first receiving groove 16. The pushing portion 310 protrudes out of the first mounting hole 210, and the engaging portion 312 is located at the boundary of the first receiving groove 16 and the second receiving groove 17. Finally, the locking component 330 and the second elastic component 331 are received in the second receiving groove 17 in order, and the second fixing component 131 is screwed into the third mounting hole 130 to press the second elastic component 331. As a result, the deformed second elastic component 331 drives the locking component 330 to be received in and engage with the engaging portion 312.

Figure 4:
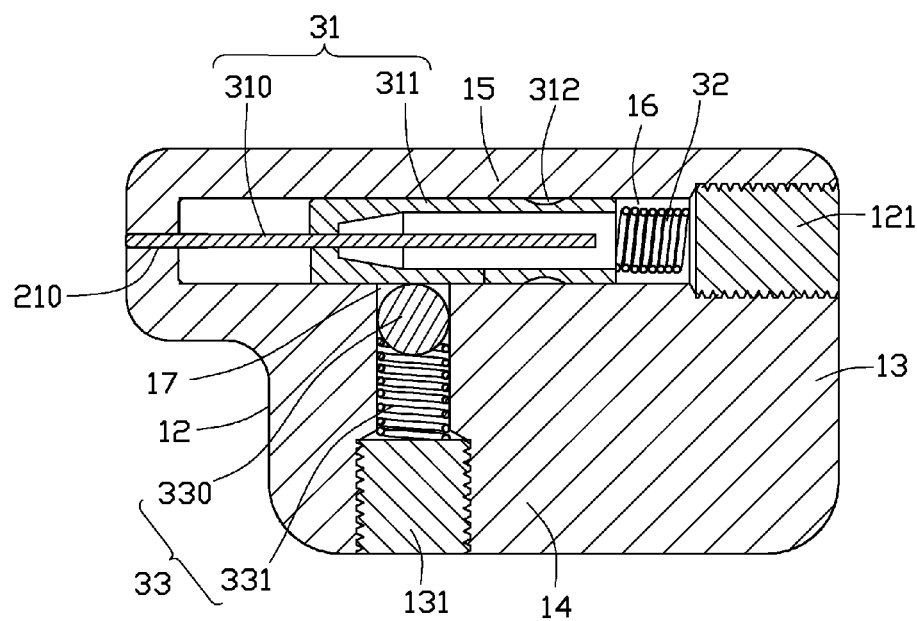
FIG. 4 is similar to FIG. 3, but showing the ejecting device in another state of use.

Referring to FIG. 4, in use, the pushing portion 310 resists an object and is driven to eject the object. When a pushing force is applied from the pushing mechanism 30 to the object is smaller than a predetermined pushing force, the first elastic component 32 abuts the pushing component 31 and the locking component 330 engages with the engaging portion 312 to cooperatively prevent the pushing component 31 from moving. Thus, the pushing component 31 is retained in the resisting position, and the pushing mechanism 30 applies a pushing force to the object. When the pushing force applied from the pushing mechanism 30 to the object is larger than the predetermined pushing force, the locking component 330 disengages from the engaging portion 312, to allow the pushing component 31 to move in the first direction and toward the first fixing component 121 with the pushing portion 310 retracted into the first mounting hole 210. At the same time, the pushing component 31 is in the unresisting position and disengages from the object, the pushing component 31 compresses the first elastic component 32, and the locking component 330 moves toward the second fixing component 131 along the second receiving groove 17 in the second direction to compress the second elastic component 331.

When the ejecting device 100 is disengaged from the object, the pushing component 31 returns to the resisting position by virtue of spring pressure of the first elastic component 32. The pushing portion 310 protrudes out of the protruding portion 21. The locking component 330 engages with the engaging portion 312.

Before use, the predetermined pushing force of the pushing component 31 may be adjusted via changing the pushing force from the first elastic component 32 to the pushing component 31, for example, changing the distance between the first fixing component 121 and the sleeve 311. The supporting force of the supporting component 33 may be adjusted via changing the supporting force from the second elastic component 331 and the locking component 330 to the pushing component 31, for example, changing the distance between the second fixing component 131 and the locking component 330.

Although information and the advantages of the present embodiments have been set forth in the foregoing description, together with details of the structures and functions of the present embodiments, the disclosure is illustrative only; changes may be made in detail, especially in the matters of shape, size, and arrangement of parts within the principles of the present embodiments to the full extent indicated by the broad general meaning of the terms in which the appended claims are expressed.

What is claimed is:

1. An ejecting device for ejecting an object, comprising:
a housing; and
a pushing mechanism received in the housing and operable between a resisting state for resisting the object and an unresisting state for disengaging from the object, the pushing mechanism comprising:
a first elastic component received in the housing; and
a pushing component, the first elastic component connecting to the pushing component for providing a resisting force to the pushing component, the pushing component comprising a pushing portion and a sleeve sleeved on the pushing portion, the sleeve connecting between the pushing portion and the first elastic component; the pushing portion being capable of being retracted into the housing when the pushing mechanism is in the unresisting state, and being capable of protruding out of the housing when the pushing mechanism is in the resisting state, the pushing component movably secured to the housing for pushing the object;
wherein when the pushing mechanism is the resisting state, the pushing component protrudes out of the housing to push the object, and when the pushing mechanism is the unresisting state, the pushing component is retracted into the housing and is disengaged from the object.

2. The ejecting device as claimed in claim 1, wherein the pushing mechanism comprises a supporting component, the supporting component engages with the pushing component for supporting the pushing mechanism in the resisting state.

3. The ejecting device as claimed in claim 2, wherein the supporting component comprises a locking component, the sleeve comprises an engaging portion; the locking component engages with the engaging portion to retain the pushing mechanism in the resisting state.

4. The ejecting device as claimed in claim 3, wherein the supporting component comprises a second elastic component, the locking component arranges between the sleeve and the second elastic component, the second elastic component is capable of providing an elastic force to drive the locking component to abut the sleeve.

5. The ejecting device as claimed in claim 4, wherein the engaging portion is a groove defined at the sleeve, the locking component is spherical-shaped component for engaging with the engaging portion.

6. The ejecting device as claimed in claim 4, wherein the housing comprises a main body and a protruding portion protruding from the main body, the protruding portion defines a first mounting hole, the main body defines a first receiving groove communicating with the first mounting hole in a first direction, the sleeve is movably received in the first receiving groove, the pushing portion is movably received in the first mounting hole.

7. The ejecting device as claimed in claim 6, wherein a size of the first receiving groove is larger than the first mounting hole for restricting the sleeve in the first receiving groove.

8. The ejecting device as claimed in claim 6, wherein the main body defines a second mounting hole communicating with the first receiving groove in the first direction, the first receiving groove connects between the first mounting hole and the second mounting hole; a first fixing component detachably received in the second mounting hole, the first elastic component is received in the first receiving groove and connects between the sleeve and the first fixing component.

9. The ejecting device as claimed in claim 8, wherein the size of the first receiving groove is smaller than the second mounting hole for restricting the first fixing component in the second mounting hole.

10. The ejecting device as claimed in claim 8, wherein the main body defines a second receiving groove communicating with the first receiving groove in a second direction, the supporting component is received in the second receiving groove; when the pushing mechanism is in the resisting state, the engaging portion is located at the boundary of the first and second receiving grooves.

11. The ejecting device as claimed in claim 10, wherein the main body defines a third mounting hole communicating with the second receiving groove, a second fixing component is detachably received in the third mounting hole, the second elastic component connects between the second fixing component and the locking component.

12. The ejecting device as claimed in claim 11, wherein a size of the third mounting hole is larger than the second receiving groove for restricting the second fixing component in the third mounting hole.

13. An ejecting device for ejecting an object, comprising:
   a housing comprising a main body, wherein the main body defines a first receiving groove and a second receiving groove perpendicularly connected to the first receiving groove;
   a pushing mechanism movably received in the main body, and the pushing mechanism comprising a first elastic component, a second elastic component, and a pushing component, wherein the first elastic component is received in the first receiving groove to provide a resisting force to the pushing component, the second elastic component received in the second receiving groove;
   wherein the housing further comprises a protruding portion protruding from the main body, the pushing component comprises a pushing portion and a sleeve provided on the pushing portion, the protruding portion defines a first mounting hole, the first receiving groove communicates with the first mounting hole in a first direction, the sleeve is movably received in the first receiving groove, and the pushing portion is movably received in the first mounting hole;
   the sleeve connects between the pushing portion and the first elastic component; the pushing portion is capable of being retracted into the housing when the pushing mechanism is in a unresisting state, and capable of protruding out of the housing when the pushing mechanism is in a resisting state; and
   wherein the pushing mechanism comprises a supporting component, the supporting component engages with the pushing component for supporting the pushing mechanism in the resisting state.

14. The ejecting device of claim 13, wherein the supporting component comprises a locking component, the second elastic component provides an elastic force to drive the locking component to abut the sleeve.

15. The ejecting device of claim 14, wherein the main body defines a second mounting hole communicating with the first receiving groove in the first direction, the first receiving groove connects between the first mounting hole and the second mounting hole; a first fixing component is detachably received in the second mounting hole, the first elastic component is received in the first receiving groove and connects between the sleeve and the first fixing component.

* * * * *